(12) United States Patent
Karczewicz et al.

(10) Patent No.: US 8,873,626 B2
(45) Date of Patent: Oct. 28, 2014

(54) TEMPLATE MATCHING FOR VIDEO CODING

(75) Inventors: Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 12/756,661

(22) Filed: Apr. 8, 2010

(65) Prior Publication Data

US 2011/0002388 A1     Jan. 6, 2011

Related U.S. Application Data

(60) Provisional application No. 61/222,836, filed on Jul. 2, 2009.

(51) Int. Cl.
*H04N 7/26* (2006.01)
*H04N 19/51* (2014.01)
*H04N 19/577* (2014.01)
*H04N 19/583* (2014.01)

(52) U.S. Cl.
CPC ... *H04N 19/00733* (2013.01); *H04N 19/00587* (2013.01); *H04N 19/00721* (2013.01); *H04N 19/00715* (2013.01)
USPC .................................................. 375/240.15

(58) Field of Classification Search
CPC ............................................... H04N 19/00781
USPC ....................................... 375/240.01, 240.15
IPC .......................................................... H04N 7/32
See application file for complete search history.

(56) References Cited

U.S. PATENT DOCUMENTS 6,760,478 B1   7/2004   Adiletta et al.
7,373,004 B2   5/2008   Chang et al.
(Continued)

FOREIGN PATENT DOCUMENTS

JP    2007043651 A    2/2007
JP    2008154015 A    7/2008
(Continued)

OTHER PUBLICATIONS

Chien W-J et al., "TE1: Decoder-side motion vector derivation report from Qualcomm", 15-21, 2. JCT-VC Meeting, Jul. 21, 2010-Jul. 28, 2010, Geneva, (Joint Collaborative Team on Video Coding of ISO/IEC JTC1/SC29/WG11 and ITU-T SG.16 ), URL: http://WFTP3.itu.int/av-arch/JCTVC-site/, Jul. 23, 2010, XP030007677, p. 1.
(Continued)

*Primary Examiner* — Jay Patel
*Assistant Examiner* — Yulin Sun
(74) *Attorney, Agent, or Firm* — Todd E. Marlette

(57) ABSTRACT

In one aspect of this disclosure, template matching motion prediction is applied to B-frames. In another aspect of this disclosure, template matching motion prediction as applied to video block coding may include generating a template offset, generating a weighted sum of absolute differences, selecting a number of hypotheses used to encode video blocks based on the cost associated with the number of hypotheses and signaling, with a new syntax, to a decoder, the number of hypotheses used in encoding, rejecting hypotheses if the difference in value between a hypothesis and a reference hypothesis is greater than a threshold value, and/or generating the content of a sub-block that does not have reconstructed data available by combining motion-compensated prediction and luma residuals.

40 Claims, 8 Drawing Sheets

(56) References Cited

U.S. PATENT DOCUMENTS

| | | | |
|---|---|---|---|
| 7,444,029 B2 | 10/2008 | Shen et al. | |
| 8,320,464 B2 | 11/2012 | Raveendran et al. | |
| 8,488,668 B2 | 7/2013 | Ye et al. | |
| 2005/0053300 A1 | 3/2005 | Mukerjee | |
| 2009/0003443 A1* | 1/2009 | Guo et al. | 375/240.13 |
| 2009/0213932 A1 | 8/2009 | Haskell et al. | |
| 2010/0272183 A1 | 10/2010 | Kamp et al. | |
| 2011/0170605 A1 | 7/2011 | Sato et al. | |
| 2011/0176741 A1 | 7/2011 | Sato et al. | |
| 2011/0255603 A1* | 10/2011 | Dencher | 375/240.16 |
| 2011/0261882 A1* | 10/2011 | Zheng et al. | 375/240.13 |

FOREIGN PATENT DOCUMENTS

| | | |
|---|---|---|
| JP | 2008289005 A | 11/2008 |
| WO | 2005109896 | 11/2005 |
| WO | 2007092192 A2 | 8/2007 |
| WO | WO2007093629 A1 | 8/2007 |
| WO | 2008157431 A2 | 12/2008 |
| WO | 2009126260 A1 | 10/2009 |
| WO | WO2009124511 A1 | 10/2009 |
| WO | 2010035730 A1 | 4/2010 |
| WO | 2010035731 A1 | 4/2010 |

OTHER PUBLICATIONS

International Search Report and Written Opinion—PCT/US2010/040475, ISA/EPO—Apr. 28, 2011.
ITU-T Rec. H.263 and superimposed prediction In: Flierl M, Girod B: "Video Coding with Superimposed Motion-Compensated Signals: Applications to H.264 and Beyond", Jan. 1, 2004, Kluwer Academic Publishers, XP002613774, ISBN: 9781402077593, pp. 69-83, sections 4.2.1-4.2.2.
Kamp S et al., "Multihypothesis prediction using decoder side-motion vector derivation in inter-frame video coding", Visual Communications and Image Processing, Jan. 20, 2009-Jan. 22, 2009, San Jose, Jan. 20, 2009, XP030081712, abstract sections 2.2, 3.2.
Kamp S et al., "Multi-Hypothesis Prediction with Decoder Side Motion Vector Derivation", 27, JVT Meeting, Jun. 4, 2008-Oct. 4, 2008, Geneva, (Joint Video Team of ISO/IEC JTC1/SC29/WG11 and ITU-T SG.16 ), Apr. 24, 2008, XP030007383, p. 2-p. 6.
Kamp S, Wien M, "Decoder-side motion vector derivation for hybrid video inter coding", IEEE International Conference on Multimedia and Expo (ICME), July 19-23, 2010 Suntec City, Singapore, Jul. 19, 2010, Jul. 23, 2010, pp. 1277-1280, XP002613773, 2010 IEEE International Conference on Multimedia and Expo (ICME) IEEE Piscataway, NJ, USA DOI: 10.1109/ICME.2010.5583097 ISBN: 978-1-4244-7491-2.
Kamp Steffen et al., "Fast decoder side motion vector derivation for inter frame, video coding", Picture Coding Symposium 2009, Jun. 5, 2009—21,25, Aug. 5, 2009, Chicago, USA, 26,28,32 May 6, 2009), XP030081800, abstract sections 1 and 2.
Peng Yin, et al., "Localized Weighted Prediction for Video Coding" IEEE, May 23, 2005, pp. 4365-4368, XP010816640 ISBN: 978-0-7803-8834-5 the whole document.
Steffen Kamp et al., "Decoder side motion vector derivation for inter frame video coding", Image Processing, 2008, ICIP, 15th IEEE International Conference, IEEE, Piscataway, NJ, USA, Oct. 12, 2008, pp. 1120-1123, XP031374203, ISBN: 978-1-4244-1765-0, abstract section 1.
Steffen Kamp et al., "Improving AVC compression performance by template matching with decoder-side motion vector derivation", 84, MPEG Meeting, Apr. 28, 2008-May 2, 2008, Archamps, (Motion Picture Expert Group or ISO/IEC JTC1/SC29/WG11), Apr. 25, 2008, XP030043972, p. 1-p. 3.
Yamamoto T. et al., "Weighted prediction using neighboring pixels", 33, VCEG Meeting, 83, MPEG Meeting, Jan. 12, 2008-Jan. 13, 2008, Antalya, (Video Coding Experts Group of ITU-T SG/16), No. VCEG-AH19, Jan. 13, 2008, XP030003557, sections 1 and 2.
Yoshinori Suzuki et al., "Inter Frame Coding with Template Matching Averaging", Image Processing, 2007, ICIP, IEEE International Conference on, IEEE, PI, Sep. 1, 2007, pp. III-409, XP031158091, ISBN: 978-1-4244-1436-9 abstract sections 1-3.
Yunfei Zheng et al., "Intra prediction using template matching with adaptive illumination compensation", Image Processing, 2008, ICIP, 15th IEEE International Conference, IEEE, Piscataway, NJ, USA, Oct. 12, 2008, pp. 125-128, XP031373954, DOI: 10.1109/ICIP.2008.4711707, ISBN: 978-1-4244-1765-0.
ITU-T Telecommunication Standardization Sector of ITU: H.264 Series H: Audiovisual and Multimedia Systems, Infrastructure of audiovisual services—Coding of moving video—Advanced video coding for generic audiovisual services—Nov. 2007, pp. 1-540.
S. Kamp and M. Wien, "Fast decoder side motion vector derivation with candidate scaling," Doc. JVT-AD018, Joint Video Team (JVT) of ISO/IEC MPEG & ITU-T VCEG, 30th Meeting, Geneva, Switzerland, Jan. 2009.
European Search Report—EP13192339—Search Authority—Berlin—Feb. 3, 2014.
Taiwan Search Report—TW099121929—TIPO—Mar. 25, 2014.

* cited by examiner

TEMPLATE MATCHING FOR VIDEO CODING

RELATED APPLICATIONS

This application claims the benefit of U.S. Provisional Application No. 61/222,836, filed on Jul. 2, 2009, the entire content of which is incorporated herein by reference.

TECHNICAL FIELD

The disclosure relates to video coding and, more particularly, video coding techniques that use template matching motion prediction.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

In video encoding, the compression often includes spatial prediction, motion estimation and motion compensation. Intra-coding relies on spatial prediction and transform coding, such as discrete cosine transform (DCT), to reduce or remove spatial redundancy between video blocks within a given video frame. Inter-coding relies on temporal prediction and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames. The term I-units may refer to I-frames, I-slices or other independently decodable portions of an I-frame.

For inter-coding, a video encoder performs motion estimation to track the movement of matching video blocks between two or more adjacent frames or other coded units, such as slices of frames. Inter-coded frames may include predictive frames ("P-frames"), which may include blocks predicted from a previous frame, and bidirectional predictive frames ("B-frames"), which may include blocks predicted from a previous frame and a subsequent frame of a video sequence. Conventional motion-compensated video coding techniques compare a video block to other video blocks of a previous or subsequent video frame in order to identify predictive video data that may be used to encode the current video block. A video block may be broken into sub-block partitions to facilitate higher quality coding.

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder may be able to reconstruct a video frame that was originally encoded. An encoded video sequence may comprise blocks of residual data, motion vectors, and possibly other types of syntax.

Template matching is a technique that can be used to eliminate motion vectors, yet still provide advantages of motion-compensated video coding. In template matching, neighboring pixels relative to video block being coded can define a template, and this template (rather than the video block being coded) can be compared to the data of a previous or subsequent video frame. Both the video encoder and the video decoder can perform the template matching process to identify motion without the use of motion vectors. Thus, with template matching, the motion vectors are not coded into bitstream. Rather, the motion vectors are essentially derived from the template matching process as the frame is encoded and decoded.

SUMMARY

In general, this disclosure describes video coding techniques applicable to template matching motion prediction coding of video blocks within video units. A video unit may comprise a video frame or a slice of a video frame. In template matching motion prediction, a video block is predicatively encoded and decoded based on one or more lists of predictive reference data without relying upon motion vectors, while still providing advantages of motion-compensated video coding. In particular, neighboring pixels relative to the video block being coded can define a template and this template, rather than the video block being coded, can be compared to the data stored in the lists of predictive reference data. The predictive reference data is generated based on one or more reference frames that may occur prior to or following a target frame.

When applying template matching prediction to B-frames, two lists of predictive video data, the first list generated from a frame occurring prior to the target frame (e.g., the previous frame) and the second list generated from a frame following the target frame (e.g., the future frame). In one aspect of this disclosure, template matching is applied to encoding and decoding B-frames. In applying template matching to B-frames, one or two hypothesis sets may be used for the B-frame. If one hypothesis set is used, the hypothesis set may contain hypotheses found from both the first list and the second list. If two hypothesis sets are used, a first hypothesis set may contain hypotheses from the first list and a second hypothesis set may contain the hypotheses found from the second list. A third hypothesis set may be formed from the bi-directional motion prediction, where data from the first list and data from the second list are combined and used for the prediction.

In another aspect of this disclosure, improved hypothesis selection and rejection is applied to template matching prediction of both P-frames and B-frames. In this context, a syntax element is introduced to signal, to the decoder, the number of hypotheses used by a coder when encoding or decoding video data using template matching prediction. For example, encoder may be configured to select one of two different numbers specifying the number of hypotheses used during the encoding process, and the decoder may be configured to apply the number of hypotheses identified by the encoder. The encoder may determine a cost associated with using either number of hypotheses during encoding and may select the number of hypotheses with the lowest cost. The encoder may then encode the video data based on the number of hypotheses with the lowest cost and may signal this number to the decoder, using the syntax element.

When determining which hypotheses to reject from consideration, an encoder or decoder compares the hypothesis under consideration (i.e., the candidate hypothesis) to a reference hypothesis. If the difference between the candidate hypothesis and the reference hypothesis is greater than a predefined threshold, the candidate hypothesis may be rejected from consideration. The reference hypothesis may be generated by averaging, in one example, all of the hypotheses under consideration or, in another example, a subset of the best hypotheses under consideration. In the hypothesis rejection aspect of this disclosure, no signaling to the encoder or decoder as to which hypothesis are accepted or rejected is required for template matching motion prediction applied to either P-frames or B-frames.

In a further aspect of this disclosure, a technique for weighting the sum of the absolute difference in template matching motion prediction on P-frames and B-frames is contemplated. A template shape can be defined relative to the current block and a corresponding template shape can be defined relative to a target block. The sum of the absolute difference is the absolute value of the difference between the pixel values of each pixel in the template shape defined relative to the current block and the pixel values of each corresponding pixel in the template shape defined relative to the reference block. The template shapes defined relative to the current block or target block may each be partitioned into two or more partitions. Each partition is given a weight that decreases as the distance between each partition and the corresponding block increases. By weighting the sum of the absolute difference, the spatial relationship of the template and the video blocks can be taken into consideration when performing template matching prediction, which may result in more accurate template matching.

In another aspect of this disclosure, a calculated template offset is applied to template matching motion prediction as applied to P-frames and B-frames. The template offset may be used to predict the offset between the reference block and the target block. When searching for the matching template, each pixel in the reference block may have a set of corresponding coordinates that define where each pixel is located in the reference block. The coordinates indicate a search position. For each search position, the average difference between the pixel value of each pixel in the template of the current frame and the pixel value of each pixel in the reference frame can be calculated. This average difference in pixel values for the entire template can be defined as the template offset. For each template, one offset may be calculated by this technique. Once the template offset is calculated, the techniques of this disclosure may calculate the sum of the absolute differences for the target block by taking each pixel value of the target block, subtracting the pixel value of the corresponding pixel in the reference block and further subtracting the offset. By adjusting the sum of the absolute difference of the target bock by the offset, it may be more likely that the selected hypothesis is the best hypothesis, thereby reducing residuals and improving video compression.

Another aspect of this disclosure contemplates a technique for incorporating a luma residual into template matching prediction applied to P-frames and B-frames. In this case, a target block may be a luma video block and the luma video block may be divided into sub-blocks. When a first sub-block of a luma block does not have reconstructed pixels available, the coding of a second sub-block that relies on the first sub-block may either be delayed until coding of the first sub-block is complete, or the coding of the second sub-block may be based upon the content of the first sub-block as generated by combining the motion-compensated prediction with the coded luma residual. By combining the motion-compensated prediction and the coded luma residual, the generated content of the first sub-block may be closer to the original data and the template matching motion prediction of the second sub-block may be more accurate.

In one example, this disclosure describes a method of coding a current video block. The method includes generating a set of hypotheses for template-matching predictive video coding, wherein at least some of the hypotheses in the set of hypotheses are based on a first set of predictive video data from at least a portion of a first predictive video unit and based on a second set of predictive video data from at least a portion of a second predictive video unit, and wherein each of the hypotheses in the set of hypothesis comprises predictive video data corresponding to a template shape defined relative to a video block location. The method further includes selecting one of the hypotheses from the set of hypotheses, and coding, via a video coder, the current video block using predictive video data identified by the selected one of the hypotheses.

In another example, this disclosure describes a method for coding a current video block. The method may include generating a first set of hypotheses for template-matching predictive video coding, wherein at least some of the hypotheses in the first set of hypotheses are based on a first set of predictive video data from at least a portion of a first predictive video unit, and wherein each hypothesis of the first set of hypotheses comprise predictive video data corresponding to a template shape defined relative to a first video block location. The method may further include generating a second set of hypotheses for template-matching predictive video coding, wherein at least some of the hypotheses in the second set of hypotheses are based on a second set of predictive video data from at least a portion of a second predictive video unit, and wherein each hypothesis of the second set of hypotheses comprise predictive video data corresponding to the template shape defined relative to a second video block location. The method may also include generating a bi-directional motion prediction based on the first set of hypotheses and the second set of hypotheses, and generating a third set of hypotheses based on the bi-directional motion prediction. In addition, the method may include selecting one of the hypotheses of the third set of hypotheses, and coding, via a video coder, the current video block using predictive video data identified by the selected one of the hypotheses.

In another example, this disclosure describes a video coding apparatus comprising a prediction unit that generates a set of hypotheses for template-matching predictive video coding, wherein at least some of the hypotheses in the set of hypotheses are based on a first set of predictive video data from at least a portion of a first predictive video unit and based on a second set of predictive video data from at least a portion of a second predictive video unit, and wherein each of the hypotheses in the set of hypothesis comprises predictive video data corresponding to a template shape defined relative to a video block location. In this example, the prediction unit selects one of the hypotheses from the set of hypotheses, wherein the video coding apparatus codes the current video unit using predictive video data identified by the selected one of the hypotheses.

In another example, this disclosure describe a video coding apparatus that codes video data, the device comprising means for generating a set of hypotheses for template-matching predictive video coding, wherein at least some of the hypotheses in the set of hypotheses are based on a first set of predictive video data from at least a portion of a first predictive video unit and based on a second set of predictive video data from at least a portion of a second predictive video unit, and wherein each of the hypotheses in the set of hypothesis comprises predictive video data corresponding to a template shape defined relative to a video block location. The video coding apparatus further comprises means for selecting one of the hypotheses from the set of hypotheses, and means for coding the current video block using predictive video data identified by the selected one of the hypotheses.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium encoded with instructions for causing one or more programmable processors to generate a set of hypotheses for template-matching predictive video coding, wherein at least some of the hypotheses in the set of hypotheses are based on a first set of predictive video data from at least a portion of a first predictive video unit and based on a second set of predictive video data from at least a portion of a second predictive video unit, wherein each of the hypotheses in the set of hypothesis comprises predictive video data corresponding to a template shape defined relative to a video block location. The instructions further comprises instructions for causing the one or more programmable processors to select one of the hypotheses from the set of hypotheses to code the current video block, and code the current video block using the selected one of the hypotheses.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
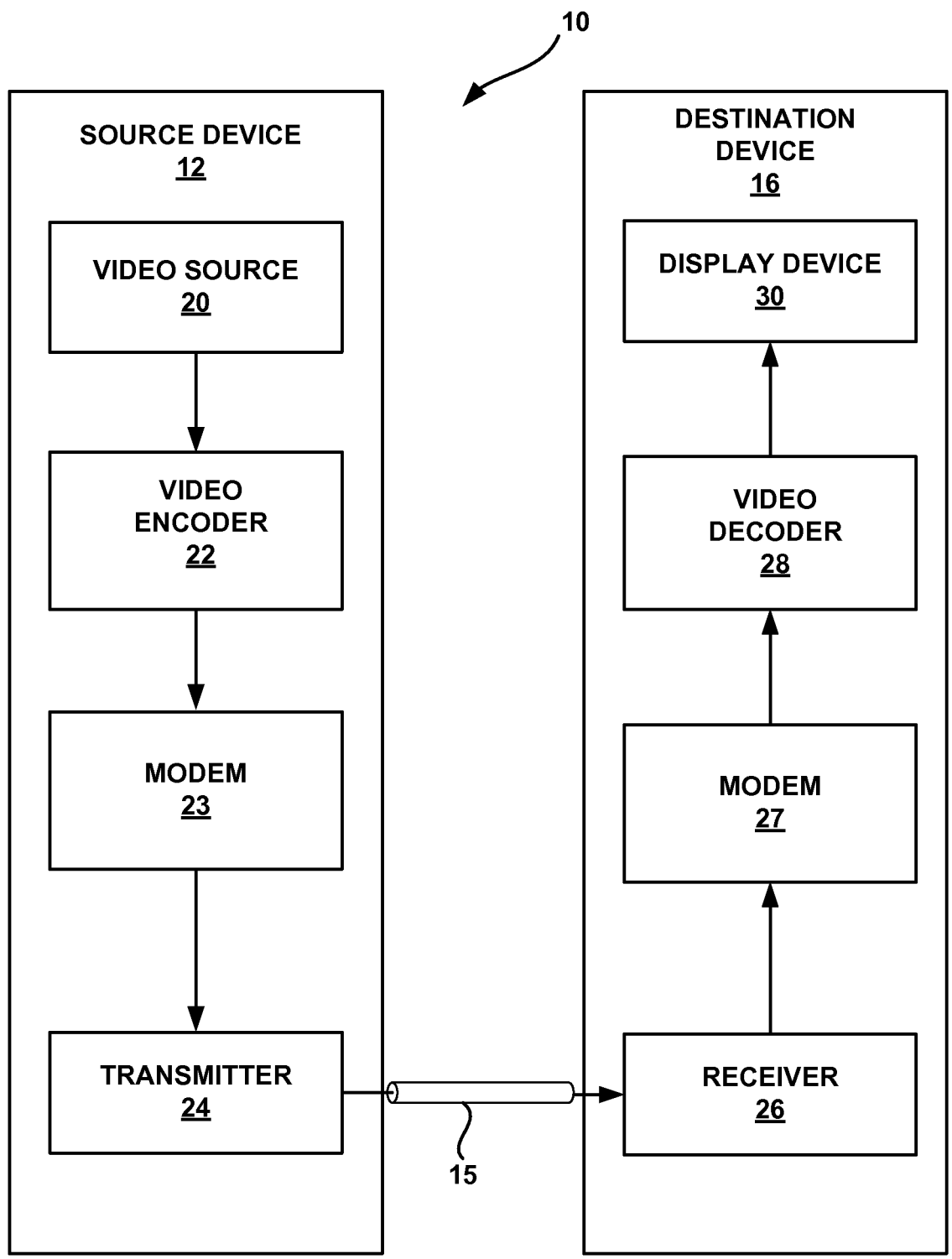
FIG. 1 is an exemplary block diagram illustrating a video encoding and decoding system.

This disclosure describes video coding techniques applicable to template matching motion prediction coding of video units. In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding or both video encoding and video decoding.

Template matching is a technique that can be used to eliminate motion vectors, yet still provide advantages of motion compensated video coding. In template matching, a template defines a shape of neighboring pixels relative to a video block being coded. The template shape is defined relative to the video block and may adjoin or surround the video block, but is not required to be located immediately adjacent to the video block. The template shape may be applied to one or more video blocks within a reference video unit. A hypothesis may be based on the predictive video data contained within a template shape, based on a first set of predictive video data from at least a portion of a first predictive video unit, or based on a first set of predictive video data from at least a portion of a first predictive video unit and a second set of predictive video data from at least a portion of a second predictive video unit. Hypotheses that are generated and considered during template matching motion prediction may be referred to as candidate hypotheses. Multiple candidate hypotheses may exist for each video block being coded.

The techniques of this disclosure include applying template matching to B-frames as well as several techniques that may be applied to improve template matching when applied to B-frame or P-frames. In one aspect of this disclosure, improved hypothesis selection and rejection is applied to template matching motion prediction. In this context, a syntax element is introduced to signal, to the decoder, the number of hypotheses used by a coder when encoding or decoding video data using template matching prediction. When determining which hypotheses to reject from consideration, an encoder or decoder compares the candidate hypothesis to a reference hypothesis. If the difference between the candidate hypothesis and the reference hypothesis is greater than a predefined threshold, the candidate hypothesis may be rejected from consideration.

In further aspects of this disclosure, techniques for weighting the sum of the absolute difference, applying a calculated template offset, and incorporating a luma residual in template matching motion prediction are contemplated. The spacial relationship of the template and the video blocks can be taken into consideration when performing template matching prediction by weighting the sum of the absolute difference, which may result in more accurate template matching. The template offset may be used to predict the offset between the reference block and the target block. Once the template offset is calculated, the techniques of this disclosure may calculate the sum of the absolute differences for the target block by taking each pixel value of the target block, subtracting the pixel value of the corresponding pixel in the reference block and further subtracting the offset. By adjusting the sum of the absolute difference of the target bock by the offset, it may be more likely that the selected hypothesis is the best hypothesis, thereby reducing residuals and improving video compression. The generated content of a first sub-block may be closer to the original data if the content is generated by combining the motion-compensated prediction and the coded luma residual and the template matching motion prediction of a second sub-block that is based on the first sub-block may be more accurate. In this manner, the techniques of this disclosure may improve template matching motion prediction by generating a coded video block that contains fewer residual values.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any devices that can communicate video information over a communication channel 15, which may or may not be wireless. The techniques of this disclosure, however, which concern template matching prediction techniques, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to apply template matching prediction to B-frames as well as P-frames. Video encoder 22 may be further configured to apply the particular template matching motion prediction aspects of this disclosure. For example, video encoder 22 may be configured to identify the number of hypotheses used when encoding video data. The number of hypotheses may be signaled to the video decoder 28, using a syntax element, as part of an encoded bitstream. Video decoder 28 may be configured to interpret and apply the syntax element that identifies the number of hypotheses to use when decoding the video data.

The illustrated system 10 of FIG. 1 is merely exemplary. The template matching prediction techniques of this disclosure may be performed by any coding device that supports motion compensated video coding using template matching. Source device 12 and destination device 16 are merely examples of such coding devices in which source device 12 generates coded video data from transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process. Some techniques of this disclosure may be specifically applied to luma blocks (or other types of blocks) that are partitioned into sub-blocks.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a group of pictures (GOPs), or another independently decodable unit defined according to the coding techniques used.

Following inter-based predictive encoding (which may include the template matching techniques of this disclosure), and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

The techniques of this disclosure are specifically applicable to template matching prediction. Bi-directional prediction is prediction of so-called "B-video blocks" based on two different lists of data. B-video blocks may be predicted from two lists of data from two previous frames, two lists of data from subsequent frames, or one list of data from a previous frame and one from a subsequent frame. In contrast, P-video blocks are predicted based on one list, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

Template matching is a technique that can be used to eliminate motion vectors, yet still provide advantages of motion compensated video coding. In template matching, a template defines a shape of neighboring pixels relative to a video block being coded. The template shape is defined relative to the video block. The template shape may adjoin the video block or surround the video block. However, the template is not required to be located immediately adjacent to the video block. That is, one or more pixels of the video block may exist between the closest edge of the template shape and the video block.

A hypothesis, in one example, may be based on the predictive video data contained within a template shape. The template shape may be applied to one or more video blocks within a reference video unit. A hypothesis refers to a corresponding template shape in a reference video unit, which is defined relative to a block of the predictive video data within the reference video unit. A hypothesis may be based on a first set of predictive video data from at least a portion of a first predictive video unit. A hypothesis may also be based on a first set of predictive video data from at least a portion of a first predictive video unit and based on a second set of predictive video data from at least a portion of a second predictive video unit. Hypotheses that are generated and considered during template matching motion prediction may be referred to as candidate hypotheses. Multiple candidate hypotheses may exist for each video block being coded.

The data defined by the template associated with the video block being coded (rather than the video block being coded itself) can be compared to the data of a corresponding template within a previous or subsequent video unit. Based on the comparison, the template matching motion prediction algorithm identifies the best hypothesis from the set of candidate hypotheses. Multiple hypotheses in the reference video unit may be considered during the coding process to create a higher likelihood that the closest matched hypothesis in the reference video unit will be found. The video block corresponding to the closest matched hypothesis may be the closest video block to the current video block and, therefore, the resulting coded video block may contain fewer residual values. The current video block is the video block being coded and may also be referred to as the target video block. Video encoder 22 and video decoder 28 can perform the template matching process to identify motion without the use of motion vectors. Thus, with template matching, the motion vectors are not coded into the bitstream. Rather, the motion vectors are essentially derived from the template matching process as the video unit is encoded and decoded.

Figure 2:
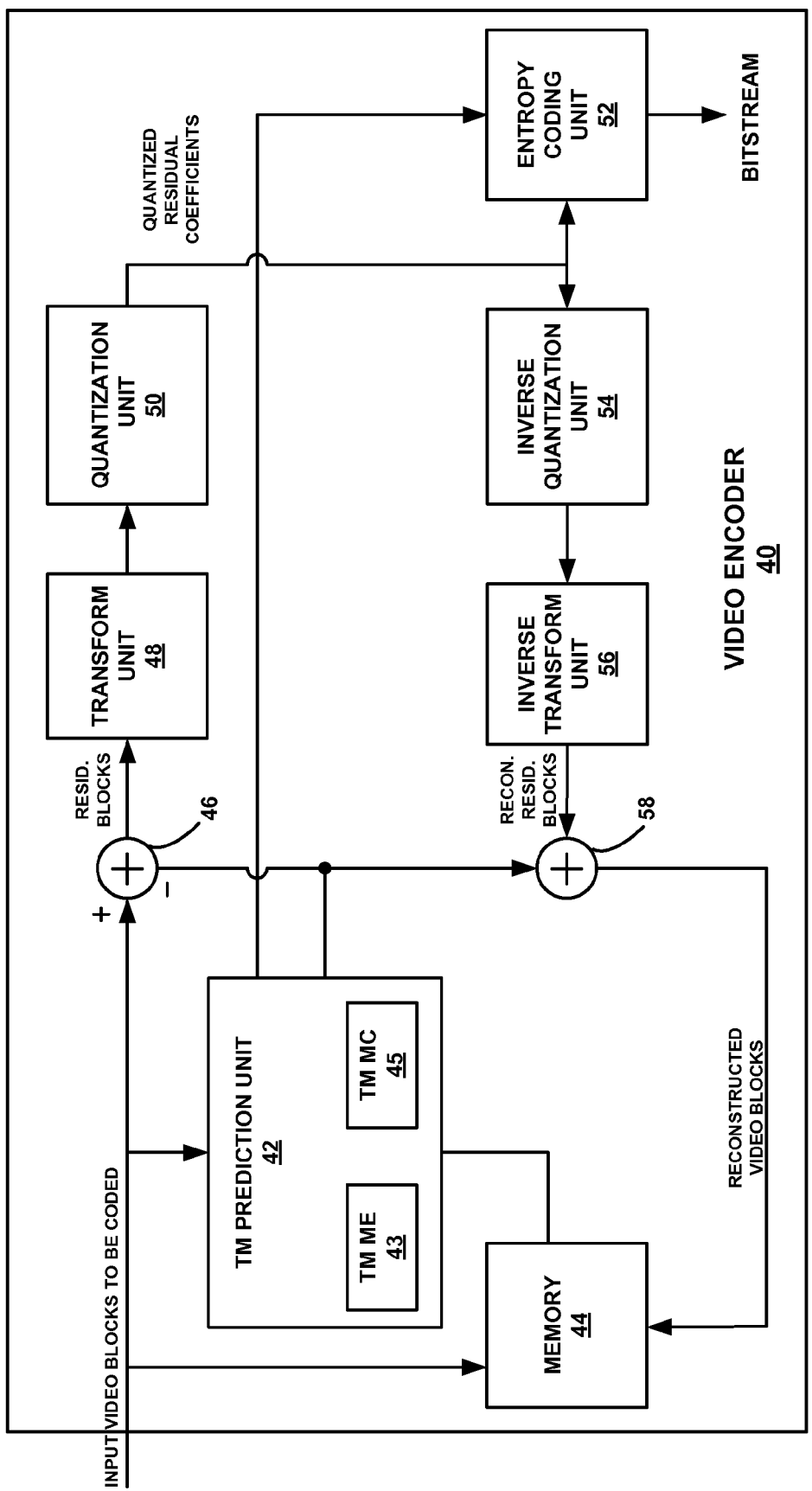
FIG. 2 is a block diagram illustrating an example of a video encoder consistent with this disclosure.

FIG. 2 is a block diagram illustrating an example of a video encoder 40 that may perform both template matching motion prediction techniques consistent with this disclosure and vector-based motion prediction techniques. Video encoder 40 is one example of a specialized video computer device or apparatus referred to herein as a "coder." Video encoder 40 may correspond to video encoder 22 of source device 12, or a video encoder of a different device. Video encoder 40 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode, and Inter-modes such as a prediction (P-mode) or a bi-directional (B-mode) may refer to the temporal based compression modes. Units encoded using B-mode are encoded with reference to two frames. In H.264 and other standards, a B-frame, or other unit, may be encoded with reference to two temporally adjacent frames. For example, if the current unit to be encoded resides within frame N, then frames N−1 and N−2 may be used as reference frames to encode the current unit. In another example, frames N+1 and N+2 may be used as reference frames to encode the current unit. In some cases, at least one temporally future frame (e.g., frame N+1) and at least one temporally prior frame (e.g., frame N−1) may be used to encode the current unit residing in frame N. Many times, only a portion of the previous or subsequent frames are actually considered or used in the encoding.

As shown in FIG. 2, video encoder 40 receives a video block within a video unit to be encoded. In the example of FIG. 2, video encoder 40 includes a template matching prediction unit 42 ("TM prediction unit 42") comprising template matching motion estimation (TM ME) unit 43 and template matching motion compensation (TM MC) unit 45. Video encoder also includes memory 44, an adder 46, a transform unit 48, a quantization unit 50, and an entropy coding unit 52. For video block reconstruction, video encoder 40 also includes an inverse quantization unit 54, an inverse transform unit 56, and an adder 58. Video encoder 40 may also include a deblocking filter (not shown) to filter block boundaries to remove blockiness artifacts from reconstructed video. If desired, the deblocking filter would typically filter the output of adder 58. Although not shown in FIG. 2, video encoder 40 may also include a prediction unit for performing vector-based motion prediction techniques. The prediction unit may generate prediction modes and motion vectors, which comprise syntax elements that may be used to identify the target blocks used to code the current video block. The prediction unit may include motion estimation and motion compensation units.

During the encoding process, video encoder receives a video block to be coded, and TM ME unit 43 and TM MC unit 45 performs inter-predictive coding. TM ME unit 43 and TM MC unit 45 may be highly integrated, but are illustrated separately for conceptual purposes. Motion estimation is typically considered the process of generating motion vectors, which estimate motion for video block. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, TM ME unit 43 and TM MC unit 45 may be functionally integrated. For demonstrative purposes, the techniques described in this disclosure are described as being performed by TM prediction unit 42.

In one example, TM prediction unit 42 applies template matching motion prediction to encode the current video block, e.g., the target video block. TM prediction unit 42 may, as an example, compare pixels within a template shape defined relative to the target block being coded to the corresponding data of a previous and/or subsequent video unit. When applying template matching motion prediction, TM prediction unit 42 may select a previous video unit or future video unit from a first set of video units (which may be referred to as list 0) and determine a set of hypotheses using only this previous or future video unit from list 0. Alternatively, TM prediction unit 42 may select a previous or future video unit from a second set of video units (which may be referred to as list 1) and determine a set of hypotheses using only this previous or future video unit from list 1.

To enable template matching on B-frames, one or two hypothesis sets may be used for the B-frame. If one hypothesis set is used, the hypothesis set may contain hypotheses found from both list 0 and list 1. If two hypothesis sets are used, one hypothesis set may contain the hypotheses found from list 1 and another hypothesis set may contain the hypotheses found from list 0. Furthermore, a third hypothesis set may be formed from the bi-directional motion prediction, where data from list 0 and data from list 1 are used for the prediction, possibly in a weighted fashion to define the data the third hypothesis set. The set of hypotheses for any given list may include one particular hypothesis that identifies a desirable predictive video block that is most similar to the video block being coded. A metric, such as the sum of absolute differences (SAD) or the sum of squared difference (SSD), may be used to find the best hypothesis, which in turn identifies the predictive video block that should be used for the coded.

TM prediction unit 42 selects one or more hypotheses from the generated set of hypotheses during the encoding process. In one example, a syntax element is introduced in order to signal the number of hypotheses used in the template matching motion prediction. In this example, two different hypothesis numbers, e.g., $K_1$ and $K_2$, may be available. $K_1$ represents a first number of hypotheses that may be used when encoding and decoding the target block and $K_2$ represents a second number, e.g., a maximum number, of hypotheses that may be used when encoding and decoding the target block. For example, $K_1$ may be four and $K_2$ may be eight. To determine the number of hypotheses to use for encoding the target block, TM prediction unit 42 may generate a first set of predictive video data based on $K_1$ hypotheses and a second set of predictive video data based on $K_2$ hypotheses. TM prediction unit 42 may generate the first set of predictive video data by identifying a subset of hypotheses that contains $K_1$ of the best hypotheses from the set of all possible hypotheses. The best hypotheses within a given subset may be the hypotheses that most closely match the video data within the template shape defined relative to the target video block being coded. Sum of absolute difference (SAD) or sum of squared difference (SSD) for example, may be applied to determine the best hypotheses to define a given subset. TM prediction unit 42 may identify the reference video blocks corresponding to each of the hypotheses in the subset of hypotheses and average the pixel values for each pixel having the same relative location in the identified reference video blocks. TM prediction unit 42 may generate a second set of predictive video data based on $K_2$ hypotheses in substantially the same manner. Although, in this example, the average pixel value for each pixel in the reference blocks is calculated to generate the sets of predictive video data associated with the $K_1$ and/or $K_2$ hypotheses, other mathematical calculations or metrics may be used to combine the different sets of predictive data associated with the $K_1$ and/or $K_2$ hypotheses.

After TM prediction unit 42 generates at least one of the first and second sets of predictive video data, TM prediction unit 42 may apply a Lagrangian multiplier to determine the cost for encoding the target block when using the first or second set of predictive video data. To determine the cost, TM prediction unit 42 uses a cost function that is defined as $C=D+\lambda R$, where C is the cost, D is the distortion, X is the Lagrangian multiplier, and R is the encoding rate. TM prediction unit 42 selects the number of hypotheses that will ultimately yield the lowest rate-distortion cost, and may identify the number of hypotheses that were used by TM prediction unit 42 in encoding the target frame through the new syntax element. When too many hypotheses are considered, the coding efficiency of template matching may suffer. By incorporating a syntax element to signal the number of hypothesis, which produces the lower cost when encoding a target block, a more desirable number of hypotheses may be considered during encoding and decoding, thereby improving the overall coding efficiency of template matching.

In one aspect of this disclosure, TM prediction unit 42 may also reject hypotheses using an improve hypothesis rejection technique. In this technique, each hypothesis under consideration is compared to a reference hypothesis. The reference hypothesis may be generated by averaging the pixel values all of the hypotheses or of a subset of the best hypotheses under consideration. If the difference between the hypothesis under consideration and the reference hypothesis is greater than a threshold, then the hypothesis under consideration may be removed from consideration. The difference may be calculated based on the weighted sum of absolute differences (WSAD), described below, or the SAD of the pixels of the hypothesis under consideration and the reference hypothesis, for example. The hypotheses may be rejected or selected without signalling to a decoder which hypotheses were rejected or selected.

Figure 3:
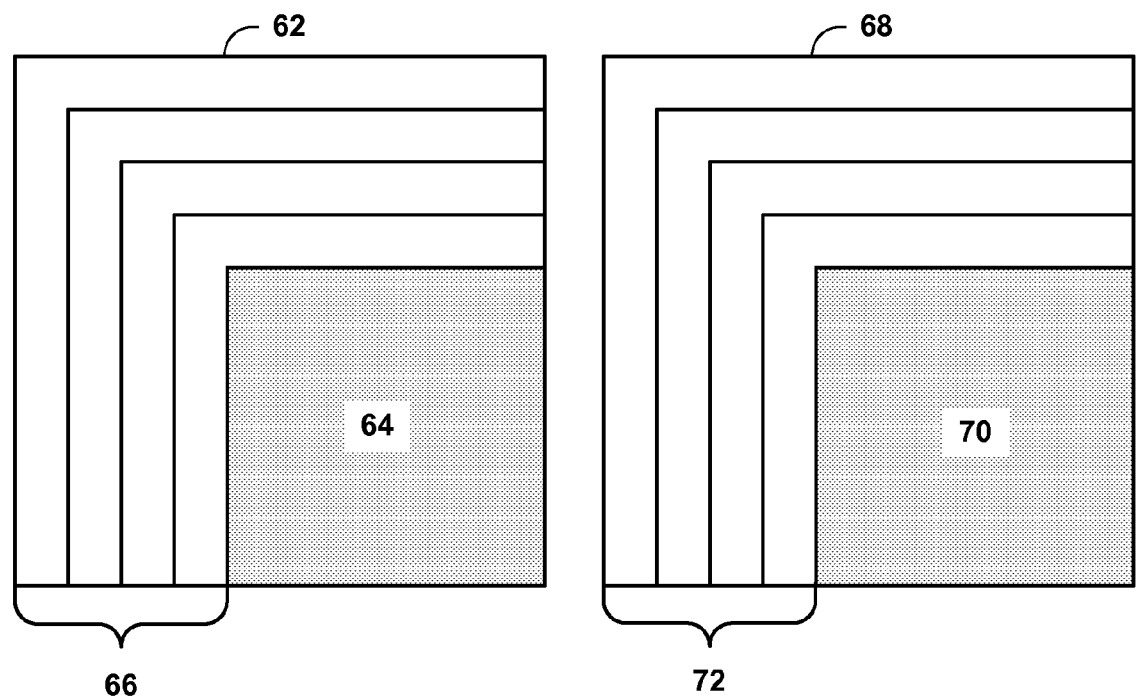
FIG. 3 is a conceptual block diagram illustrating an example target video unit and reference video unit consistent with this disclosure.

In accordance with another aspect of this disclosure, SAD may be weighted to improve hypothesis selection. SAD is the sum of the absolute value of the difference between the pixel value of each pixel in the current block and the corresponding pixel in the reference block. The template of the current block and the template of the reference block may be partitioned into K parts. As shown in FIG. 3, target video unit 62 includes target block 64 and target block template 66 and reference video unit 68 includes reference block 70 and reference block template 72. In this example, the target block template 66 and reference block template 72 are each partitioned into four template partitions. The weighting given to each particular template partition of target block template 66 or reference block template 72 may decrease when the distance between each template partition and the target block 64 or reference block 70 increases. The weighted sum of the absolute differences (WSAD) may be defined as:

$$WSAD = \sum_{k=1}^{K} \sum_{n_k} w_k \cdot |T_{Pk} - T_{Bk}|$$

where $w_k$ is the weight value for the kth template partition, $T_{Pk}$ is the kth template partition associated with the reference block, $T_{Bk}$ is the kth template partition associated with the target block, $n_k$ is the number of pixels in the template partition k, and K is the number of partitions the template associated with the target block and the template associated with the reference block are each divided into.

TM prediction unit 42 may also apply a calculated template offset to predict the offset between the reference block and the target block to improve the quality of the video encoding. When searching for the best matching hypothesis defined by the template shape, TM prediction unit 42 may calculate the average difference between the pixel value of each pixel within the template defined relative to the target block and the pixel value of each pixel in the candidate hypothesis using the following formula:

$$\text{offset} = \frac{1}{K} \sum_{k=1}^{K} (T_{Bk} - T_{Pk})$$

where $T_{Bk}$ is a pixel value of a pixel in the candidate hypothesis, $T_{Pk}$ is a pixel value of a pixel in the template defined relative to the target block, K is the number of pixels in the template defined relative to the target block, and offset is the average difference in pixel value between the pixels of the candidate hypothesis and the template defined relative to the target block. This average difference in pixel values is known as the template offset. For each candidate hypothesis of the set of potential hypotheses, TM prediction unit 42 may calculate one such offset.

Once the template offset is calculated for a particular candidate hypothesis, TM prediction unit 42 may calculate the sum of the absolute differences for the candidate hypothesis by taking each pixel value of the candidate hypothesis, subtracting the pixel value of the corresponding pixel in the reference template and further subtracting the offset. The sum of absolute differences of the candidate hypothesis is defined as:

$$SAD = \sum_{k=1}^{K} |T_{Pk} + \text{offset} - T_{Bk}|$$

where $T_{Bk}$ is a pixel value of a pixel in the candidate hypothesis, $T_{Pk}$ is a pixel value of a pixel in the template defined relative to the target block, K is the number of pixels in the candidate hypothesis, and offset is the average difference in pixel value between the pixels of the candidate hypothesis and the pixels of the template defined relative to the target block. The obtained template offset is assumed to be the offset of the target block. By taking the template offset into consideration, the motion-compensated prediction of the target block can be represented as:

$$B' = P + \text{offset}$$

where B' is the motion-compensated prediction of the target block, P is the pixel value of a pixel in the reference block, and offset is the average offset for the template as previously calculated. By adjusting the sum of the absolute difference of the target block by the template offset, it is more likely that the selected hypotheses are actually the best hypotheses, thereby reducing residuals and decreasing the amount of information that must be stored.

Figure 4:
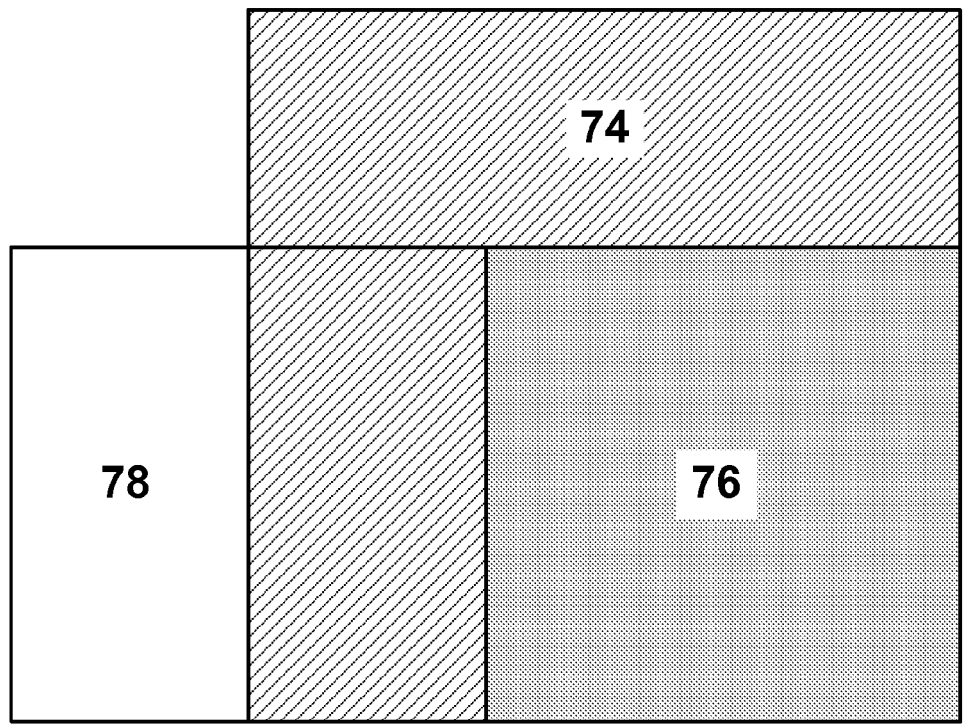
FIG. 4 is a conceptual block diagram illustrating an example of template matching motion prediction where the content of a video block is determined consistent with this disclosure.

In FIG. 4, template 74 is defined relative to target sub-block 76 and overlays a portion of sub-block 78 where sub-block 76 and sub-block 78 are partitions of the same video block. If sub-block 78 does not have reconstructed pixels available, the content of sub-block 78 may be determined by using the motion-compensated prediction result, for example. If the content of sub-block 78 is determined by using the motion-compensated prediction result, the accuracy of the motion prediction of target sub-block 76 may suffer because the motion-compensated prediction result of sub-block 78 may significantly differ from the original data. To improve the accuracy of the motion prediction of target sub-bock 76 when sub-block 78 does not have reconstructed pixels available, TM prediction unit 42 may wait until sub-block 78 has been coded before coding target sub-block 76. By waiting until sub-block 78 has been coded, the content of sub-block 78 is closer to the original data and the template matching motion-prediction of target sub-block 76 can be more accurate.

In one example, sub-block 76 and sub-block 78 are sub-blocks of a luma video block. In general, a luma video block is a 16 by 16 block of luma values for pixels within the video block. A luma video block may be partitioned into multiple 8 by 8, 8 by 4, or 4 by 4 pixel sub-blocks, for example. To determine the content of sub-block 78, TM prediction unit 42 first calculates the motion-compensated prediction and the luma residual for sub-block 78. The motion-compensated prediction includes the pixel values of the corresponding sub-block in the reference video unit. The luma residual is the different in luma values of sub-block 78 and the corresponding sub-block in the reference video unit. TM prediction unit 42 then combines the motion-compensated prediction and the coded luma residual into coded luma results to determine the content of sub-block 78. Once TM prediction unit 42 has determined the content of sub-block 78, pixel values are available for template 74 and TM prediction unit 42 may proceed with performing template matching motion-prediction for sub-block 76.

Figure 5:
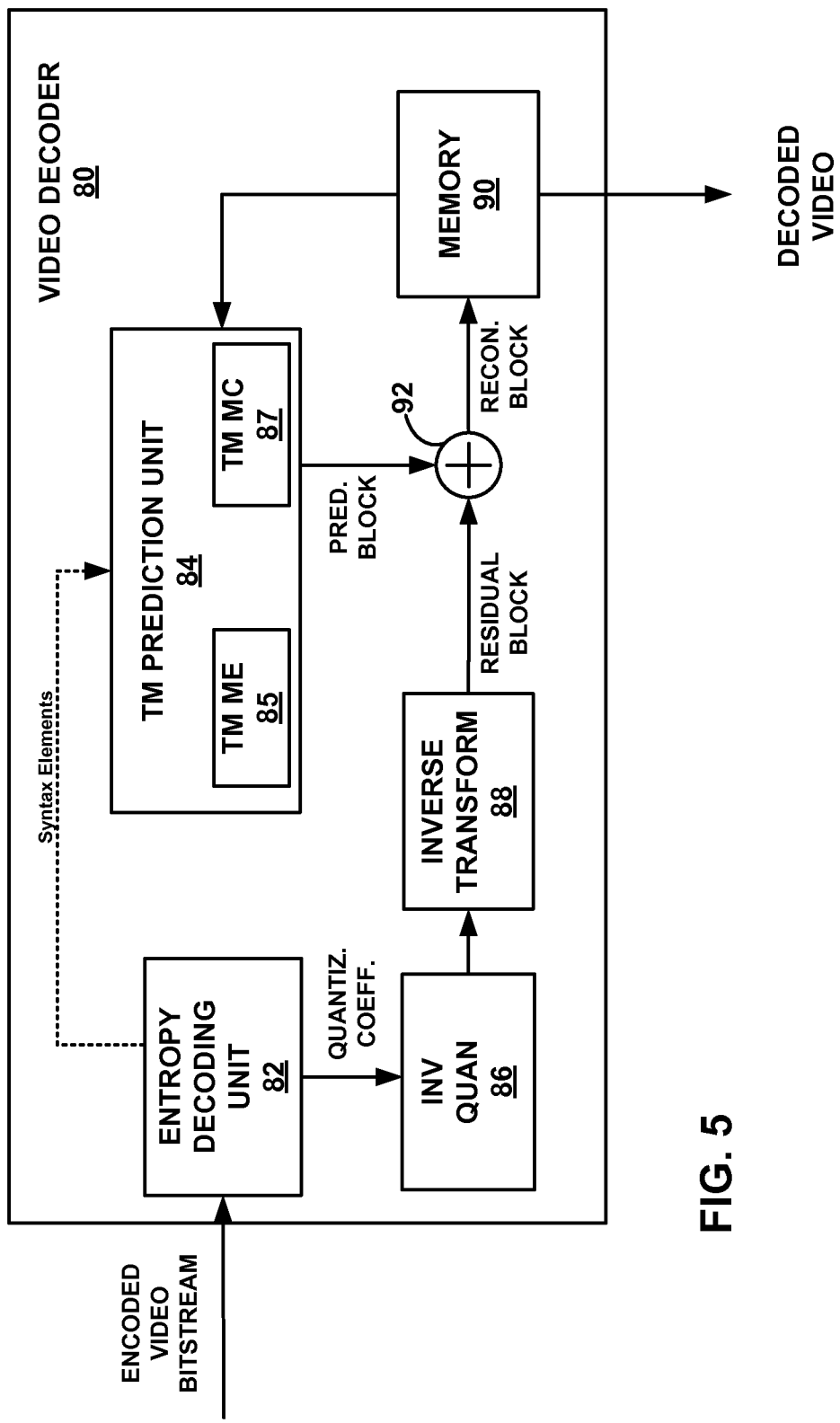
FIG. 5 is a block diagram illustrating an example of a video decoder consistent with this disclosure.

FIG. 5 is a block diagram illustrating an example of a video decoder 80, which may perform the reciprocal decoding techniques to the encoding techniques described above, such as applying template matching motion prediction to P-frames and B-frames, applying a hypothesis number defined by a syntax element, calculating and applying a WSAD, and/or calculating and applying a template offset. Video decoder 80 may include an entropy decoding unit 82, a template matching (TM) prediction unit 84, an inverse quantization unit 86, an inverse transform unit 88, a memory 90 and adder 92. TM prediction unit 84 may include a template matching motion estimation (TM ME) unit 85, a template matching motion compensation (TM MC) unit 87, as well as spatial prediction components, which are not shown for simplicity and ease of illustration.

In general, entropy decoding unit 82 receives an encoded bitstream and decodes the bitstream to generate quantized coefficients and other syntax elements. Prediction unit 84 may perform template matching motion prediction consistent with this disclosure. The syntax elements may include information specifying the number of hypotheses considered by a video encoder when encoding the encoded video unit. TM prediction unit 84 may consider the identified number of hypotheses when decoding the video unit by limiting the number of hypotheses used during the decoding process to the number of hypotheses identified by the syntax element. When decoding an encoded video unit using the number of hypotheses identified by the syntax element, TM prediction unit 84 may generate a set of predictive video data by identifying a subset of hypotheses that contains the number of best hypotheses identified by the syntax element from the set of all possible hypotheses. The best hypotheses within a given subset may be the hypotheses that most closely match the video data within the template shape defined relative to the target block being coded. SAD or SSD, for example, may be applied to determine the best hypotheses to define a given subset. TM prediction unit 84 may identify the reference video blocks corresponding to each of the hypotheses in the subset of hypotheses and average the pixel values for each pixel having the same relative location in the identified reference video blocks. Although, in this example, the average pixel value for each pixel in the reference blocks is calculated to generate the set of predictive video data associated with the number of hypotheses identified by the syntax element, other mathematical calculations or metrics may be used. In general, the same mathematical calculation used by the encoder is also used by the decoder. In this manner, TM prediction unit 84 generates a set of predictive video data for decoding the encoded video block.

The quantized coefficients are sent from entropy decoding unit 82 to inverse quantization unit 86, which performs inverse quantization. Inverse transform unit 88 then inverse transforms the de-quantized coefficients back to the pixel domain to generate a residual block. Adder 92 combines the set of predictive data generated by TM prediction unit 84 with the residual block from inverse transform unit 88 to create a reconstructed video block, which may be stored in memory 90 and/or output from video decoder 80 as decoded video output.

Figure 6A:
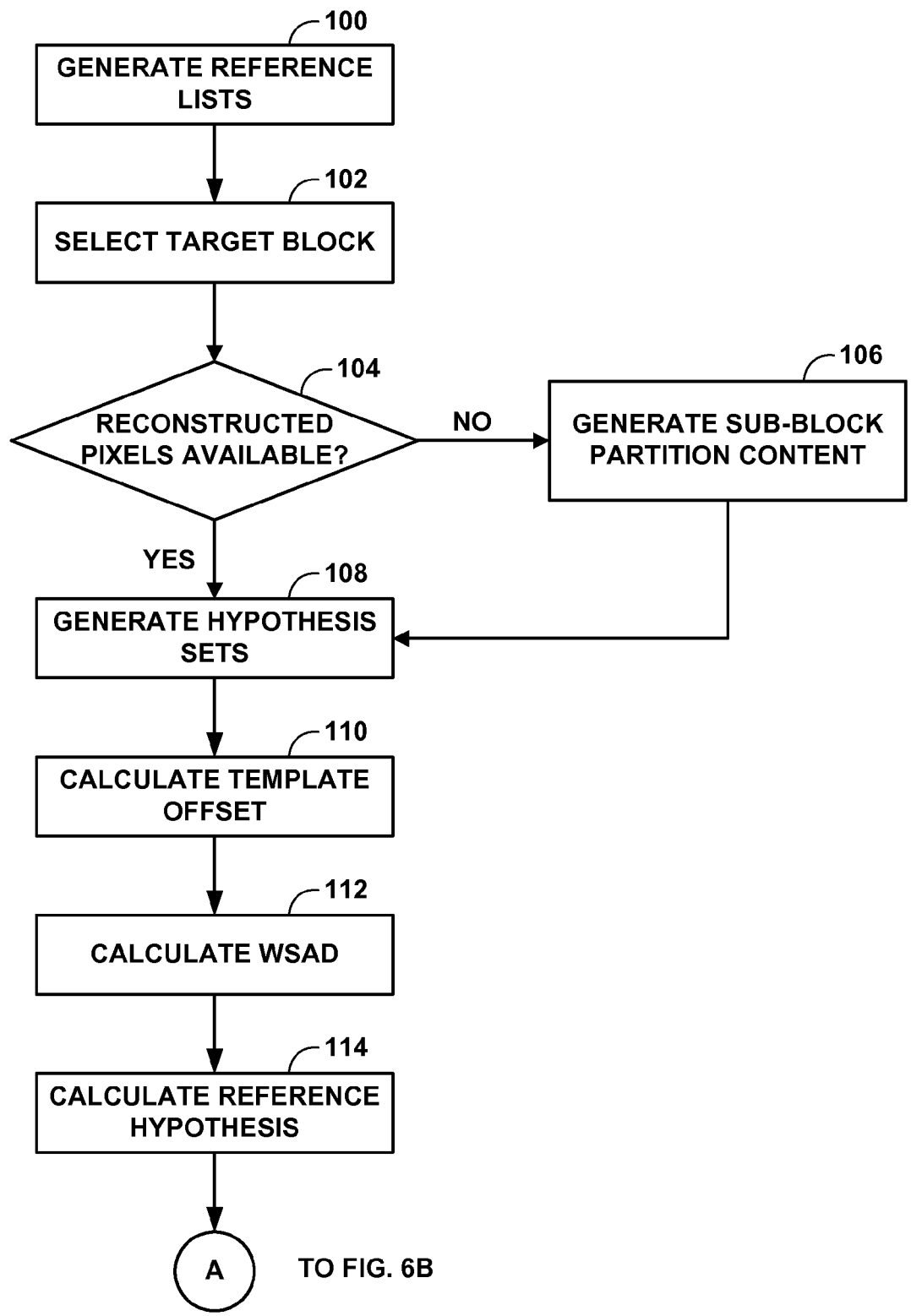
FIGS. 6A-6B are flow charts illustrating an exemplary process performed by a video encoder consistent with this disclosure
Figure 6B:
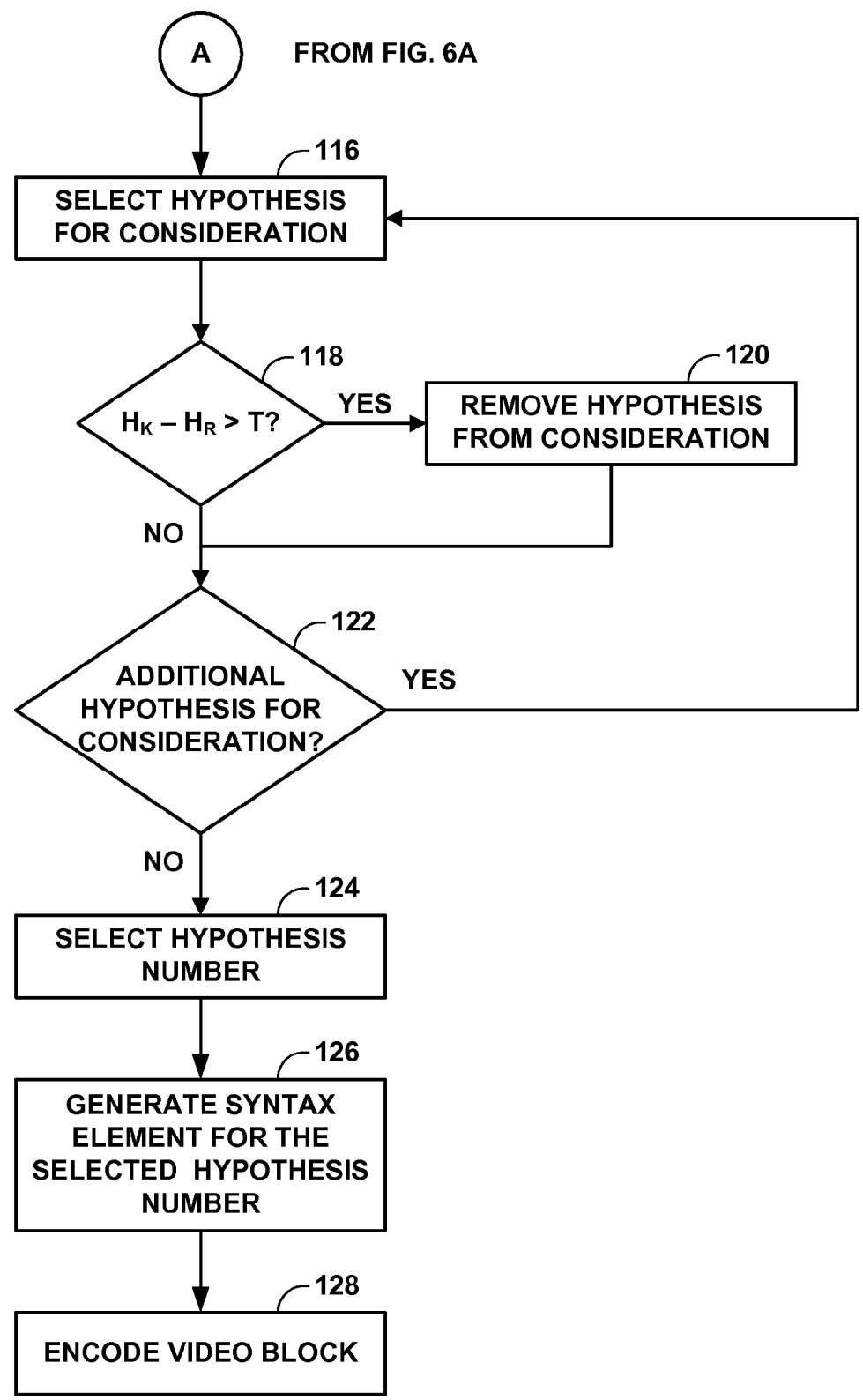

FIGS. 6A-6B are flow charts illustrating an exemplary process performed by a video encoder consistent with this disclosure. FIGS. 6A-6B will be described from the perspective of video encoder 40 of FIG. 2. As shown in FIG. 6A, TM prediction unit 42 generates reference lists (100). The reference lists may include video information from one or more reference video units. The reference video units may occur prior in time or later in time relative to a video unit that includes the target video block. TM prediction unit 42 then selects a target video block (102) and defines a template shape relative to the target block. If the target block is a sub-block of a luma block and some portion of the template shape does not have reconstructed pixels available (NO in 104), TM prediction unit 42 generates the sub-block partition content associated with the portion of the template shape that does not have reconstructed pixels available (106). In particular, the sub-block partition content may be generated by combining the luma residual with the motion-compensated prediction of the sub-block partition. Once the sub-block partition content is generated (106) or if reconstructed pixels are available for the entire template associated with the target block (YES in 104), then TM prediction unit 42 generates one or more hypotheses sets based on the reference lists and the template associated with the target block (108).

For each hypothesis of the set of hypotheses, TM prediction unit 42 calculates the template offset (110) by calculating the average different between each pixel value in the template shape defined relative to the target block and the pixel value of each pixel in a candidate hypothesis from the set of hypotheses. TM prediction unit 42 then may calculate the weighted sum of absolute differences for each hypothesis (112). In one example, TM prediction unit 42 calculates the WSAD using the pixel values calculated based on the template offset by multiplying the calculated pixel values by a weighting factor such that the weighting factor decreases as the distance between the video block and the template partition increases. In another example, TM prediction unit 42 calculates the WSAD by multiplying the calculated pixel values by a weighting factor such that the weighting factor decreases as the distance between the video block and the template partition increases, but without adjusting the pixel values based on the template offset. TM prediction unit 42 may calculate the SAD rather than the WSAD by eliminating the weighting factor. In calculating the WSAD or SAD, TM prediction unit 42 may incorporate the calculated template offset. Once the template offset and either the WSAD or the SAD are calculated, TM prediction unit 42 may generate a reference hypothesis (114), in one example, by averaging all of the hypotheses under consideration, or, in another example, by averaging a subset of the best hypotheses under consideration.

With respect to FIG. 6B, TM prediction unit 42 may then select one of the hypotheses available for consideration (116) and calculate the difference between the hypothesis being considered, $H_K$, and the reference hypothesis, $H_R$ and compare the difference in value to a threshold value, T (118). This difference value between the hypothesis being considered, $H_K$, and the reference hypothesis, $H_R$, may comprise the sum of absolute difference between each pixel of the hypothesis being considered, $H_K$, and the reference hypothesis, $H_R$. If this difference (i.e., if the SAD of the pixels of the hypothesis under consideration and the reference hypothesis) is greater than a threshold T (yes of 118), then that hypothesis may be removed from consideration (120). However, if the difference between the pixels of $H_K$ and the pixels of $H_R$ are less than T (NO in 118) or after $H_K$ is removed from consideration (120), TM prediction unit 42 determines if there are any hypotheses remaining in the set of hypotheses under consideration (122). If there are hypotheses remaining, TM prediction unit 42 selects a new hypothesis for consideration (116), and determines if the difference in value between the hypothesis being considered and the previously generated reference hypothesis is greater than the threshold value (118). Once there are no more hypotheses available for consideration that have not already been considered, (NO in 122), TM prediction unit 42 selects the hypothesis number (124) by calculating the cost associated with encoding the target video block when a first number of hypotheses and the cost associated with encoding the target video block when a second number of hypotheses from the set of hypotheses are used for the encoding.

To select the number of hypotheses to use for encoding the target block (124), TM prediction unit 42 may generate a first set of predictive video data based on a first number of hypotheses and a second set of predictive video data based on a second number of hypotheses. TM prediction unit 42 may generate the first set of predictive video data by identifying a subset of hypotheses that contains the first number of best hypotheses from the set of all possible hypotheses. TM prediction unit 42 then may identify the reference video blocks corresponding to each of the hypotheses in the subset of hypotheses and average the pixel values for each pixel having the same relative location in the identified reference video blocks. TM prediction unit 42 may generate a second set of predictive video data based on the second number hypotheses in substantially the same manner. After TM prediction unit 42 generates at the first and second sets of predictive video data, TM prediction unit 42 determines the rate-distortion cost for encoding the target block when using the first or second set of predictive video data. TM prediction unit 42 selects the number of hypotheses that will ultimately yield the lowest rate-distortion cost.

TM prediction unit 42 then generates the syntax element for the selected hypothesis number (126). The syntax element signals to the decoder whether the first number or the second number of selected hypotheses were used when encoding the target block (126). Video encoder 40 can then encode the video block (128) based on a set of predictive video data. In one example, video encoder 40 encodes the video block based on the set of predictive video data associated with the hypothesis number having the lowest cost. In another example, TM prediction unit 42 selects a best hypothesis and video encoder 40 encodes the video block based on the predictive video data contained within the reference video block associated with best hypothesis. In another example, TM prediction unit 42 may generate predictive video data based on all of the reference video blocks associated with all of the remaining hypotheses available for consideration and video encoder 40 encodes the video block based on this predictive video data.

Figure 7A:
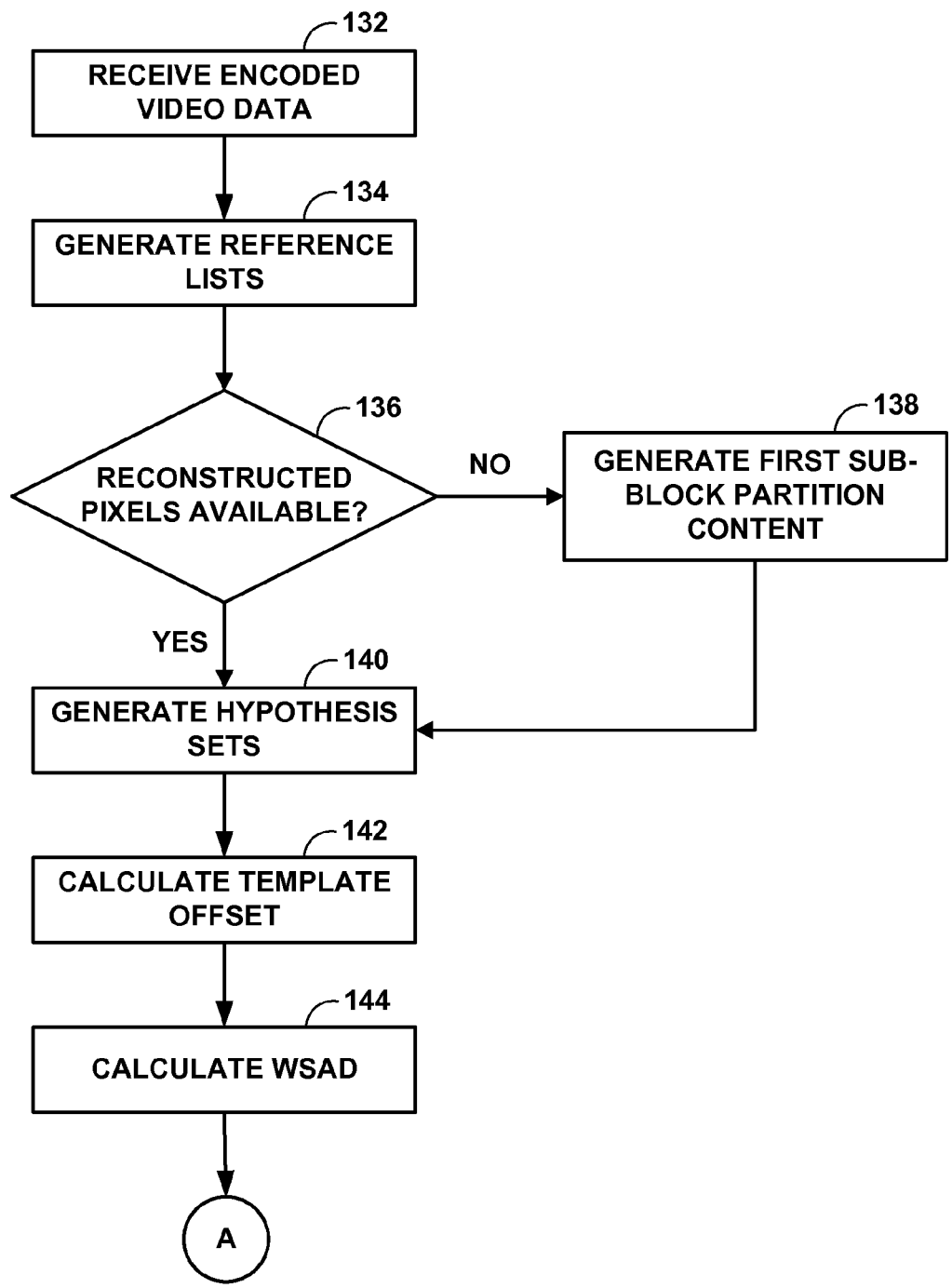
FIGS. 7A-7B are flow charts illustrating an exemplary process performed by a video decoder consistent with this disclosure.
Figure 7B:
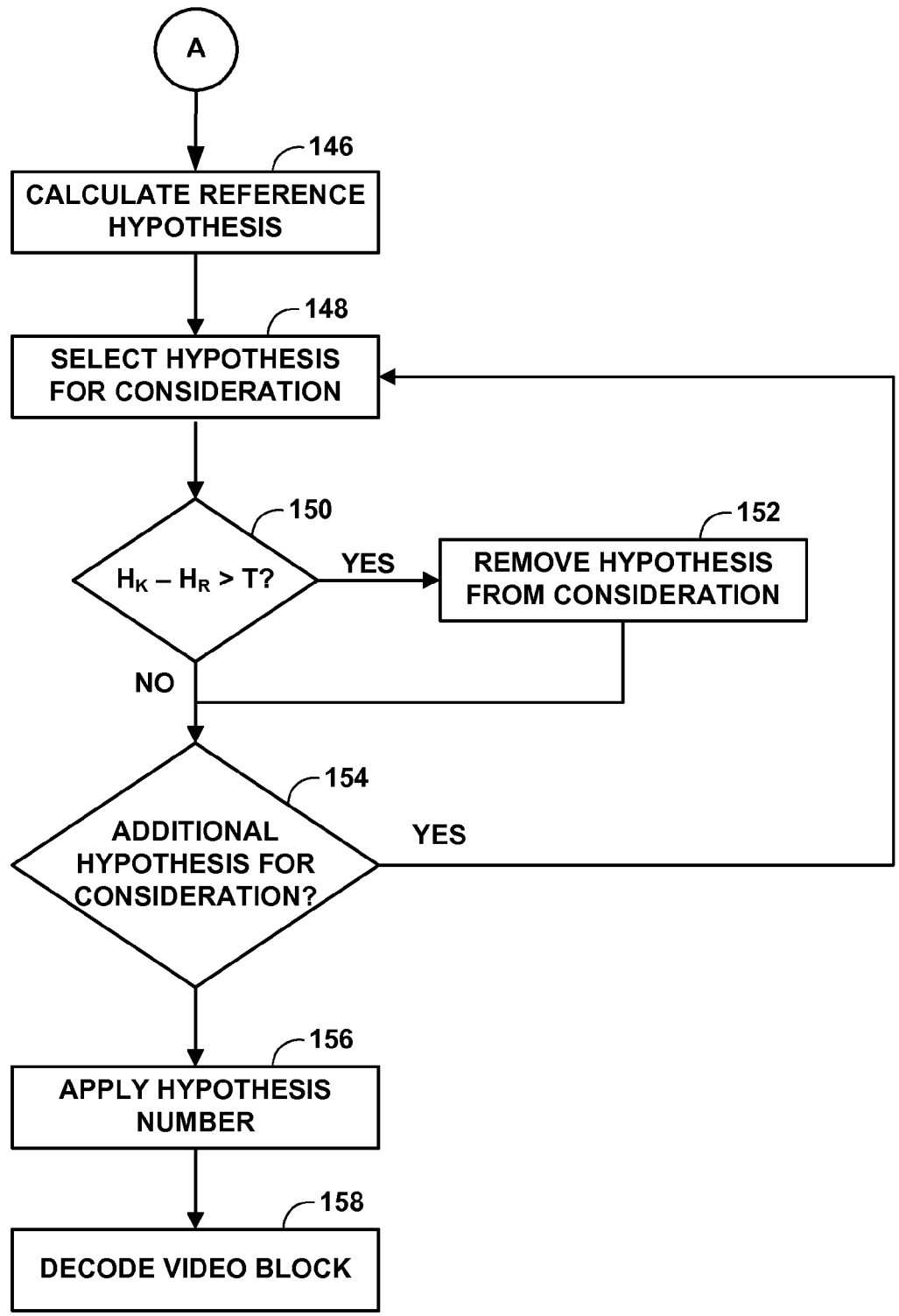

FIGS. 7A-7B are flow charts illustrating an exemplary process performed by a video decoder consistent with this disclosure. FIGS. 7A-7B will be described from the perspective of video decoder 80 of FIG. 5. As shown in FIG. 7A, video decoder 80 receives encoded video data (132), and receives one or more syntax elements that identify the hypothesis number used by the video encoder in encoding the encoded video data. TM prediction unit 84 selects a target video block, identifies the template associated with the target block, and generates the reference lists (134). The reference lists include video information from one or more reference video units. The reference video units may occur prior in time or later in time relative to a video unit that includes the target video block. If portions of the template shape defined relative to the target block do not have reconstructed pixels available (NO in 136) and the target block is a sub-block of a luma block, TM prediction unit 84 may generate the sub-block partition content associated with the portion of the template shape that does not have reconstructed pixels available (138). In particular, the sub-block partition content may be generated by combining the luma residual with the motion-compensated prediction. Once the sub-block partition content is generated (138) or if reconstructed pixels are available for the entire template shape defined relative to the target block (YES in 136), TM prediction unit 42 generates one or more hypotheses sets based on the reference lists and the template associated with the target block (140).

For each hypothesis in the set of hypotheses, TM prediction unit 84 may calculate a template offset (142) by calculating the average different between the pixel values of each pixel in the template shape defined relative to the target block and the pixel value of each corresponding pixel in a candidate hypothesis of the set of hypotheses. TM prediction unit 84 then may calculate the weighted sum of absolute differences for each hypothesis (144). In one example, TM prediction unit 84 calculates the WSAD using the pixel values calculated based on the template offset by multiplying the calculated pixel values by a weighting factor such that the weighting factor decreases as the distance between the video block and the template partition increases. In another example, TM prediction unit 84 calculates the WSAD by multiplying the calculated pixel values by a weighting factor such that the weighting factor decreases as the distance between the video block and the template partition increases, but without adjusting the pixel values based on the template offset. TM prediction unit 84 may calculate the SAD rather than the WSAD by eliminating the weighting factor. In calculating the SAD, TM prediction unit 84 may incorporate the calculated template offset.

With respect to FIG. 7B, TM prediction unit 84 may calculate a reference hypothesis (146), in one example, by averaging all of the hypotheses under consideration, or, in another example, a subset of the best hypotheses under consideration. TM prediction unit 84 may then select one of the hypotheses available for consideration (148) and calculate the difference between the hypothesis being considered, $H_K$, and the reference hypothesis, $H_R$ and compare the difference in value to a threshold value, T (150). This difference value between the hypothesis being considered, $H_K$, and the reference hypothesis, $H_R$, may comprise the sum of absolute difference between each pixel of the hypothesis being considered, $H_K$, and the reference hypothesis, $H_R$. If this difference (i.e., if the SAD of the pixels of the hypothesis under consideration and the reference hypothesis) is greater than a threshold T (YES in 150), then that hypothesis may be removed from consideration. If the difference in value is less than T (NO in 150) or after $H_K$ is removed from consideration (152), TM prediction unit 84 determines if there are any hypotheses remaining in the set of hypotheses under consideration (154). If there are hypotheses remaining, prediction unit selects a new hypothesis for consideration (148), and determines if the difference in value between the hypothesis being considered and the previously generated reference hypothesis is greater than a threshold value (150). Once there are no more hypotheses available for consideration that have not already been considered, (NO in 154), TM prediction unit 84 may decode a syntax element that identifies the number of hypotheses considered in encoding the target block and apply the hypothesis number (156).

To apply the hypothesis number (156), TM prediction unit 84 generates a set of predictive video data by identifying a subset of hypotheses that contains the number of best hypotheses identified by the syntax element from the set of all possible hypotheses. TM prediction unit 84 then may identify the reference video blocks corresponding to each of the hypotheses in the subset of hypotheses and average the pixel values for each pixel having the same relative location in the identified reference video blocks. Video decoder 80 can then decode the video based on predictive video data (158). In one example, video decoder 80 decodes the video block based on the set of predictive video data associated with the hypothesis number having the lowest cost. In another example, TM prediction unit 84 selects a best hypothesis and video decoder 80 decodes the video block based on the predictive video data contained within the reference video block associated with best hypothesis. In another example, TM prediction unit 84 may generate predictive video data based on all of the reference video blocks associated with all of the remaining hypotheses available for consideration and video decoder 80 encodes the video block based on this predictive video data.

A video coder operating in accordance with this disclosure may omit one or more steps of the example methods shown in FIGS. 6A-6B and 7A-7B. For example, a video coder may not calculate a template offset, calculate a weighted sum of the absolute differences, generate a reference hypothesis, or utilize a syntax specifying a hypothesis number. Generally, a video coder will perform the template matching motion prediction techniques described in this disclosure by at least selecting a target block, generating a set of hypotheses, and coding a video unit based on the set of hypotheses.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A video coding method for coding a current video block of a current video unit, the method comprising:
generating a first set of hypotheses for template-matching predictive video coding, wherein the hypotheses in the first set are based on individual frames of data from at least one of a list containing previous frames in display order and a list containing future frames in display order;
generating a second set of hypotheses for template-matching predictive video coding, wherein the hypotheses in the second set are based on bi-directional motion prediction between one or more pairs of frames wherein each pair of frames comprises one frame from the list containing previous frames in display order and one frame from the list containing future frames in display order;
wherein each of the hypotheses in the first and second sets of hypotheses comprises video data corresponding to a template shape defined relative to a video block location;
applying techniques for selecting one or more hypotheses from among the first and second sets of hypotheses, wherein the techniques for selecting are based at least in part on a number of hypotheses to use for coding the current video block, and wherein the number of hypothesis is identified from a predetermined set of numbers of hypotheses;
coding, via a video coder, the current video block using predictive video data from the selected hypotheses to produce a coded video block; and
generating a syntax element that indicates the identified number of hypotheses, wherein the syntax element is provided to a video decoder to decode the coded video block.

2. The video coding method of claim 1, wherein the video coder comprises a video encoder, wherein the method further comprises:
generating a first set of predictive video data based on a first subset of hypotheses in the set of hypotheses;
generating a second set of predictive video data based on a second subset of hypotheses in the set of hypotheses;
calculating a first cost associated with encoding the current video block, wherein calculating the first cost includes determining a number of bits and a level of quality of the current video block after being encoded using the first set of predictive video data;

calculating a second cost associated with encoding the current video block, wherein calculating the second cost includes determining a number of bits and a level of quality of the current video block after being encoded using the second set of predictive video data;

determining a lowest cost associated with encoding the current video block from the first cost and the second cost; and setting a syntax element to signal whether the first subset of hypotheses or the second subset of hypotheses should be used by a decoder.

3. The video coding method of claim 1,
wherein the video coder comprises a video decoder,
wherein the method further comprises:

decoding one or more syntax elements that identify a number of hypotheses of the set of hypotheses used in encoding encoded video data;

identifying a subset of hypotheses from the set of hypotheses, wherein the subset includes the number of hypotheses signaled by the one or more syntax elements; and generating a set of predictive video data based on the subset of hypotheses, and wherein coding the current video block further comprises decoding the encoded video data using the generated set of predictive video data.

4. The video coding method of claim 1, wherein generating the set of hypotheses comprises calculating a weighted sum of absolute differences, wherein calculating the weighted sum includes partitioning a template associated with the current video block into a plurality of partitions and multiplying a sum of the absolute differences of each partition of the plurality of partitions by a value that decreases as a distance of the partition under consideration from the current video block increases.

5. The video coding method of claim 1, wherein generating the set of hypotheses comprises:

calculating a template offset, wherein calculating comprises calculating the average difference in pixel values of a template defined relative to the current video block and pixel values of a first hypothesis of the set of hypotheses; and applying the template offset to the difference between each of the pixel values of the first hypothesis and each of the pixels values of the template defined relative to the current video block.

6. The video coding method of claim 1, wherein the current video block is a luma video block, wherein the luma video block includes a plurality of sub-blocks, and wherein selecting one of the hypotheses from the set of hypotheses to code the current video block comprises:

selecting a first sub-block of the plurality of sub-blocks;
defining a template shape relative to a location of the first sub-block;
calculating a luma residual of a second sub-block, wherein at least a portion of the second sub-block is located within at least a portion of the template shape;
calculating a motion-compensated prediction of pixel values of the second sub-block; and
generating predictive video data for pixels within the template shape based on the luma residual and the motion-compensated prediction of pixel values.

7. The video coding method of claim 1, wherein:
the predetermined set of numbers of hypotheses comprises a first number of hypotheses ($K_1$) and a second number of hypotheses ($K_2$),
$K_1$ and $K_2$ are both greater than one and $K_2$ is greater than $K_1$, and
$K_2$ is a maximum number of hypotheses to use for coding the current video block.

8. A video coding method for coding a current video block of a current video unit, the method comprising:

generating one or more sets of hypotheses for template-matching predictive video coding, wherein each of the hypotheses in the one or more sets of hypotheses is based on a predictive video block in a video unit different from the current video unit, and wherein each of the hypotheses in the one or more sets of hypotheses comprises predictive video data in a template having a shape that matches a shape of a template corresponding to the current video block;

generating a reference hypothesis based on the one or more sets of hypotheses, wherein the reference hypothesis comprises an average of pixel values for each pixel location of a plurality of hypotheses in the one or more sets of hypotheses;

removing from the one or more sets of hypotheses each hypothesis for which a difference in value between a metric of the hypothesis and a metric of the reference hypothesis is greater than the threshold value;

selecting one or more hypotheses from those remaining in the one or more sets of hypotheses based on a number of hypotheses to use for coding the current video block, wherein the number of hypothesis is identified from a predetermined set of numbers of hypotheses;

coding, via a video coder, the current video block based on the selected one or more hypotheses to produce a coded video block; and generating a syntax element that indicates the identified number of hypotheses, wherein the syntax element is provided to a video decoder to decode the coded video block.

9. The video coding method of claim 8, wherein:
the predetermined set of numbers of hypotheses comprises a first number of hypotheses ($K_1$) and a second number of hypotheses ($K_2$),
$K_1$ and $K_2$ are both greater than one and $K_2$ is greater than $K_1$, and
$K_2$ is a maximum number of hypotheses to use for coding the current video block.

10. A video coding apparatus that codes a current video block, the apparatus comprising:

a prediction unit configured to generate a first set of hypotheses and a second set of hypotheses for template-matching predictive video coding, wherein the hypotheses in the first set are based on individual frames of data from at least one of a list containing previous frames in display order and a list containing future frames in display order, and the hypotheses in the second set are formed from bi-directional motion prediction between one or more pairs of frames wherein each pair of frames comprises one frame from the list containing previous frames in display order and one frame from the list containing future frames in display order, wherein each of the hypotheses in the first and second sets of hypotheses comprises video data corresponding to a template shape defined relative to a video block location, and configured to apply techniques for selecting one or more hypotheses from among the first and second sets of hypotheses, wherein the techniques for selecting are based at least in part on a number of hypotheses to use for coding the current video block, and wherein the number of hypothesis is identified from a predetermined set of numbers of hypotheses; and a video coding unit configured to code the current video block using the predictive video data from the selected hypotheses to produce a coded video block, and wherein the prediction unit is further configured to generate a syntax element that indicates the identified number of hypotheses, and wherein the syntax element is provided to a video decoder to decode the coded video block.

11. The video coding apparatus of claim 10, wherein the video coding unit is a video encoder, and wherein the prediction unit further generates a first set of predictive video data based on a first subset of hypotheses in the set of hypotheses, generates a second set of predictive video data based on a second subset of hypotheses in the set of hypotheses, calculates a first cost associated with encoding the current video block by at least determining a first number of bits and a first level of quality of the current video block after being encoded using the first set of predictive video data, calculates a second cost associated with encoding the current video block by at least determining a second number of bits and a second level of quality of the current video block after being encoded using the second set of predictive video data, determines a lowest cost associated with encoding the current video block from the first cost and the second cost, and sets a syntax element to signal whether the first subset of hypotheses or the second subset of hypotheses should be used by a decoder.

12. The video coding apparatus of claim 10, wherein the video coding unit is a video decoder, wherein the video decoder comprises an entropy unit that receives encoded video data and decodes one or more syntax elements that identify a number of hypotheses used in encoding the encoded video data, identifies a subset of hypotheses of from the set of hypotheses, wherein the subset includes the number of hypotheses signaled by the one or more syntax elements, and generates a set of predictive video data based on the subset of hypotheses, and wherein the video decoder decodes the encoded video data using the generated set of predictive video data.

13. The video coding apparatus of claim 10, wherein the prediction unit generates the set of hypotheses by at least calculating a weighted sum of absolute differences, wherein the weighted sum of absolute differences is calculated by at least partitioning a template associated with the current video block into a plurality of partitions and multiplying a sum of the absolute differences of each partition of the plurality of partitions by a value that decreases as a distance of the partition under consideration from the current video block increases.

14. The video coding apparatus of claim 10, wherein the prediction unit generates the set of hypotheses by at least calculating a template offset by at least calculating the average difference in pixel values of a template defined relative to the current video block and pixel values of a first hypothesis of the set of hypotheses, and applying a template offset to the difference between each of the pixel values of the first hypothesis and each of the pixels values of the template defined relative to the current video block.

15. The video coding apparatus of claim 10, wherein the current video block is a luma video block, wherein the luma video block includes a plurality of sub-blocks, and wherein the prediction unit selects one of the hypotheses from the set of hypotheses by at least selecting a first sub-block of the plurality of sub-blocks, defining a template shape relative to the first sub-block location, calculating a luma residual of a second sub-block, wherein at least a portion of the second sub-block is located within at least a portion of the template shape, calculating a motion-compensated prediction of pixel values of the second sub-block, and generating predictive video data for pixels within the template shape based on the luma residual and the motion-compensated prediction of pixel values.

16. The video coding apparatus of claim 10, wherein:
the predetermined set of numbers of hypotheses comprises a first number of hypotheses ($K_1$) and a second number of hypotheses ($K_2$),
$K_1$ and $K_2$ are both greater than one and $K_2$ is greater than $K_1$, and
$K_2$ is a maximum number of hypotheses to use for coding the current video block.

17. A video coding apparatus for coding a current video block of a current video unit, the video coding apparatus comprising:
a prediction unit; and
a video coding unit,
wherein the prediction unit is configured to:
generate one or more sets of hypotheses for template-matching predictive video coding, wherein each of the hypotheses in the one or more sets of hypotheses is based on a predictive video block in a video unit different from the current video unit, and wherein each of the hypotheses in the one or more sets of hypotheses comprises predictive video data in a template having a shape that matches a shape of a template corresponding to the current video block,
generate a reference hypothesis based on the one or more sets of hypotheses, wherein the reference hypothesis comprises an average of pixel values for each pixel location of a plurality of hypotheses in the one or more sets of hypotheses,
remove from the one or more sets of hypotheses each hypothesis for which a difference in value between a metric of the hypothesis and a metric of the reference hypothesis is greater than the threshold value, and
select one or more hypotheses from those remaining in the one or more sets of hypotheses based on a number of hypotheses to use for coding the current video block, wherein the number of hypothesis is identified from a predetermined set of numbers of hypotheses,
wherein the video coding unit is configured to code the current video block based on the selected one or more hypotheses to produce a coded video block, and
wherein the prediction unit is further configured to generate a syntax element that indicates the identified number of hypotheses, wherein the syntax element is provided to a video decoder to decode the coded video block.

18. The video coding apparatus of claim 17, wherein the video coding apparatus comprises an integrated circuit.

19. The video coding apparatus of claim 17, wherein the video coding apparatus comprises a microprocessor.

20. The video coding apparatus of claim 17, wherein the video coding apparatus comprises a wireless communication device that includes a video coder.

21. The video coding apparatus of claim 17, wherein:
the predetermined set of numbers of hypotheses comprises a first number of hypotheses ($K_1$) and a second number of hypotheses ($K_2$),
$K_1$ and $K_2$ are both greater than one and $K_2$ is greater than $K_1$, and $K_2$ is a maximum number of hypotheses to use for coding the current video block.

22. A device that codes a current video block, the device comprising:

means for generating a first set of hypotheses for template-matching predictive video coding, wherein the hypotheses in the first set are based on individual frames of data from at least one of a list containing previous frames in display order and a list containing future frames in display order;

means for generating a second set of hypotheses for template-matching predictive video coding, wherein the hypotheses in the second set are formed from bi-directional motion prediction between one or more pairs of frames wherein each pair of frames comprises one frame from the list containing previous frames in display order and one frame from the list containing future frames in display order;

wherein each of the hypotheses in the set of hypothesis comprises predictive video data corresponding to a template shape defined relative to a video block location;

means for applying techniques for selecting one or more hypotheses from among the first and second sets of hypotheses, wherein the techniques for selecting are based at least in part on a number of hypotheses to use for coding the current video block, and wherein the number of hypothesis is identified from a predetermined set of numbers of hypotheses;

means for coding the current video block using predictive video data from the selected hypotheses to produce a coded video block; and means for generating a syntax element that indicates the identified number of hypothesis, wherein the syntax element is provided to a video decoder to decode the coded video block.

23. The device of claim 22, wherein the means for coding the current video block further comprises:

means for generating a first set of predictive video data based on a first subset of hypotheses in the set of hypotheses;

means for generating a second set of predictive video data based on a second subset of hypotheses in the set of hypotheses;

means for calculating a first cost associated with encoding the current video block, wherein calculating the first cost includes determining a number of bits and a level of quality of the current video block after being encoded using the first set of predictive video data;

means for calculating a second cost associated with encoding the current video block, wherein calculating the second cost includes determining a number of bits and a level of quality of the current video block after being encoded using the second set of predictive video data;

means for determining a lowest cost associated with encoding the current video block from the first cost and the second cost; and means for setting a syntax element to signal whether the first subset of hypotheses or the second subset of hypotheses should be used by a decoder.

24. The device of claim 22, wherein means for coding the current video block further comprises means for decoding encoded video data, wherein the device further comprises:

means for decoding one or more syntax elements that identify a number of hypotheses of the set of hypotheses used in encoding encoded video data;

means for identifying a subset of hypotheses from the set of hypotheses, wherein the subset includes the number of hypotheses signaled by the one or more syntax elements; and means for generating a set of predictive video data based on the subset of hypotheses, and wherein the means for decoding the encoded video data decodes the encoded video using the generated set of predictive video data.

25. The device of claim 22, wherein the means for generating the set of hypotheses comprises means for calculating a weighted sum of absolute differences, wherein calculating the weighted sum of absolute differences includes partitioning a template associated with the current video block into a plurality of partitions and multiplying the sum of the absolute differences of each partition of the plurality of partitions by a value that decreases as the distance of the partition under consideration from the current video block increases.

26. The device of claim 22, wherein the means for generating the set of hypotheses generates the set of hypotheses comprises:

means for calculating a template offset comprising calculating the average difference in pixel values of a template of the current video block and pixel values of a first hypothesis of the set of hypotheses; and means for applying the template offset to a difference between each of the pixel values of the first hypothesis and each of the pixels values of the template defined relative to the current video block.

27. The device of claim 22, wherein the current video block is a luma video block, wherein the luma video block includes a plurality of sub-blocks, and wherein the means for selecting one of the hypotheses from the set of hypotheses comprises:

means for selecting a first sub-block of the plurality of sub-blocks;

means for defining a template shape relative to a location of the first sub-block;

means for calculating a luma residual of a second sub-block, wherein at least a portion of the second sub-block is located within at least a portion of the template shape;

means for calculating a motion-compensated prediction of pixel values of the second sub-block; and means for generating predictive video data for pixels within the template shape based on the luma residual and the motion-compensated prediction of pixel values.

28. The device of claim 22, wherein:

the predetermined set of numbers of hypotheses comprises a first number of hypotheses ($K_1$) and a second number of hypotheses ($K_2$), $K_1$ and $K_2$ are both greater than one and $K_2$ is greater than $K_1$, and $K_2$ is a maximum number of hypotheses to use for coding the current video block.

29. A device that codes a current video block of a current video unit, the device comprising:

means for generating one or more sets of hypotheses for template-matching predictive video coding, wherein each of the hypotheses in the one or more sets of hypotheses is based on a predictive video block in a video unit different from the current video unit, and wherein each of the hypotheses in the one or more sets of hypotheses comprises predictive video data in a template having a shape that matches a shape of a template corresponding to the current video block;

means for generating a reference hypothesis based on the one or more sets of hypotheses, wherein the reference hypothesis comprises an average of pixel values for each pixel location of a plurality of hypotheses in the one or more sets of hypotheses;

means for removing from the one or more sets of hypotheses each hypothesis for which a difference in value between a metric of the hypothesis and a metric of the reference hypothesis is greater than the threshold value;

means for selecting one or more hypotheses from those remaining in the one or more sets of hypotheses based on a number of hypotheses to use for coding the current video block, wherein the number of hypothesis is identified from a predetermined set of numbers of hypotheses;

means for coding the current video block based on the selected one or more hypotheses to produce a coded video block; and means for generating a syntax element that indicates the identified number of hypothesis, wherein the syntax element is provided to a video decoder to decode the coded video block.

30. The device of claim 29, wherein:

the predetermined set of numbers of hypotheses comprises a first number of hypotheses ($K_1$) and a second number of hypotheses ($K_2$), $K_1$ and $K_2$ are both greater than one and $K_2$ is greater than $K_1$, and $K_2$ is a maximum number of hypotheses to use for coding the current video block.

31. A non-transitory computer-readable storage medium encoded with instructions for causing one or more programmable processors to:

generate a first set of hypotheses for template-matching predictive video coding, wherein the hypotheses in the first set are based on individual frames of data from at least one of a list containing previous frames in display order and a list containing future frames in display order;

generate a second set of hypotheses for template-matching predictive video coding, wherein the hypotheses in the second set are formed from bi-directional motion prediction between one or more pairs of frames wherein each pair of frames comprises one frame from the list containing previous frames in display order and one frame from the list containing future frames in display order;

wherein each of the hypotheses in the first and second sets of hypotheses comprises video data corresponding to a template shape defined relative to a video block location;

apply techniques for selecting one or more hypotheses from among the first and second sets of hypotheses, wherein the techniques for selecting are based at least in part on a number of hypotheses to use for coding the current video block, and wherein the number of hypothesis is identified from a predetermined set of numbers of hypotheses;

code the current video block using predictive video data from the selected hypotheses to produce a coded video block; and generate a syntax element that indicates the identified number of hypothesis, wherein the syntax element is provided to a video decoder to decode the coded video block.

32. The computer-readable storage medium of claim 31, wherein the instructions that cause the one or more programmable processors to code the current video block further comprise instructions for causing the one or more programmable processors to:

generate a first set of predictive video data based on a first subset of hypotheses in the set of hypotheses;

generate a second set of predictive video data based on a second subset of hypotheses in the set of hypotheses;

calculate a first cost associated with encoding the current video block, wherein calculating the first cost includes determining a number of bits and a level of quality of the current video block after being encoded using the first set of predictive video data;

calculate a second cost associated with encoding the current video block, wherein calculating the second cost includes determining a number of bits and a level of quality of the current video block after being encoded using the second set of predictive video data;

determine a lowest cost associated with encoding the current video block from the first cost and the second cost; and set a syntax value to signal whether the first subset of hypotheses or the second subset of hypotheses should be used by a decoder.

33. The computer-readable storage medium of claim 31, wherein the instructions that cause the one or more programmable processors to select one of the hypotheses of the set of hypotheses further comprise instructions for causing the one or more programmable processors to:

decode one or more syntax elements that identify a number of hypotheses of the set of hypotheses used in encoding encoded video data;

identify a subset of hypotheses from the set of hypotheses, wherein the subset includes the number of hypotheses signaled by the one or more syntax elements;

generate a set of predictive video data based on the subset of hypotheses; and decode the encoded video data using the generated set of predictive video data.

34. The computer-readable storage medium of claim 31, wherein the instructions that cause the one or more programmable processors to generate the set of hypotheses further comprise instructions for causing the one or more programmable processors to calculate a weighted sum of absolute differences by at least partitioning a template associated with the current video block into a plurality of partitions and multiplying the sum of the absolute differences of each partition of the plurality of partitions by a value that decreases as the distance of the partition under consideration from the current video block increases.

35. The computer-readable storage medium of claim 31, wherein the instructions that cause the one or more programmable processors to generate the set of hypotheses further comprise instructions for causing the one or more programmable processors to:

calculate a template offset by at least calculating the average difference in pixel values of a template defined relative to the current video block and pixel values of a first hypothesis of the set of hypotheses; and apply the template offset to a difference between each of the pixel values of the first hypothesis and each of the pixels values of the template defined relative to the current video block.

36. The computer-readable storage medium of claim 31, wherein the instructions that cause the one or more programmable processors to generate the set of hypotheses further comprise instructions for causing the one or more programmable processors to:

select a first sub-block of the plurality of sub-blocks;

define a template shape relative to a location of the first sub-block;

calculate a luma residual of a second sub-block, wherein at least a portion of the second sub-block is located within at least a portion of the template shape;

calculate a motion-compensated prediction of pixel values of the second sub-block; and generate predictive video data for pixels within the template shape based on the luma residual and the motion-compensated prediction of pixel values.

37. The computer-readable storage medium of claim 31, wherein:

the predetermined set of numbers of hypotheses comprises a first number of hypotheses ($K_1$) and a second number of hypotheses ($K_2$), $K_1$ and $K_2$ are both greater than one and $K_2$ is greater than $K_1$, and $K_2$ is a maximum number of hypotheses to use for coding the current video block.

38. A non-transitory computer-readable storage medium encoded with instructions for causing one or more programmable processors to:

generate one or more sets of hypotheses for template-matching predictive video coding, wherein each of the hypotheses in the one or more sets of hypotheses is based on a predictive video block in a video unit different from a current video unit having a current video block, and wherein each of the hypotheses in the one or more sets of hypotheses comprises predictive video data in a template having a shape that matches a shape of a template corresponding to the current video block;

generate a reference hypothesis based on the one or more sets of hypotheses, wherein the reference hypothesis comprises an average of pixel values for each pixel location of a plurality of hypotheses in the one or more sets of hypotheses;

remove from the one or more sets of hypotheses each hypothesis for which a difference in value between a metric of the hypothesis and a metric of the reference hypothesis is greater than the threshold value;

select one or more hypotheses from those remaining in the one or more sets of hypotheses based on a number of hypotheses to use for coding the current video block, wherein the number of hypothesis is identified from a predetermined set of numbers of hypotheses;

code the current video block based on the selected one or more hypotheses to produce a coded video block; and generate a syntax element that indicates the identified number of hypothesis, wherein the syntax element is provided to a video decoder to decode the coded video block.

39. The computer-readable storage medium of claim 38, wherein:

the predetermined set of numbers of hypotheses comprises a first number of hypotheses ($K_1$) and a second number of hypotheses ($K_2$), $K_1$ and $K_2$ are both greater than one and $K_2$ is greater than $K_1$, and $K_2$ is a maximum number of hypotheses to use for coding the current video block.

40. A video coding method for coding a current video block of a current video unit, the method comprising:

generating one or more sets of hypotheses for template-matching predictive video coding, wherein each of the hypotheses in the one or more sets of hypotheses is based on a predictive video block in a video unit different from the current video unit, and wherein each of the hypotheses in the one or more sets of hypotheses comprises predictive video data in a template having a shape that matches a shape of a template corresponding to the current video block;

selecting one or more hypotheses from the one or more sets of hypotheses based on a hypotheses number identified from a predetermined set of hypotheses numbers;

coding, via a video coder, the current video block based on the selected one or more hypotheses to produce a coded video block; and generating a syntax element that indicates the identified hypotheses number, wherein the syntax element is provided to a video decoder to decode the coded video block.

* * * * *